United States Patent
Weder

(10) Patent No.: US 6,779,301 B2
(45) Date of Patent: *Aug. 24, 2004

(54) METHOD OF CONTAINING A POT OR FLORAL GROUPING IN A SLEEVE HAVING EXPANDABLE SIDEWALLS

(75) Inventor: Donald E. Weder, Highland, IL (US)

(73) Assignee: Southpac Trust International, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 10/411,587

(22) Filed: Apr. 10, 2003

(65) Prior Publication Data

US 2003/0192242 A1 Oct. 16, 2003

Related U.S. Application Data

(63) Continuation of application No. 10/090,009, filed on Feb. 27, 2002, now Pat. No. 6,574,919, which is a continuation-in-part of application No. 09/899,416, filed on Jul. 5, 2001, now Pat. No. 6,401,388, which is a continuation of application No. 09/360,865, filed on Jul. 23, 1999, now Pat. No. 6,125,578, which is a continuation-in-part of application No. 09/146,162, filed on Sep. 2, 1998, now Pat. No. 6,105,310, which is a continuation-in-part of application No. 09/064,460, filed on Apr. 22, 1998, now Pat. No. 6,151,830, which is a continuation-in-part of application No. 08/788,616, filed on Jan. 27, 1997, now Pat. No. 5,749,171, which is a continuation-in-part of application No. 08/237,078, filed on May 3, 1994, now Pat. No. 5,625,979.

(51) Int. Cl.[7] .............................................. A01G 9/02
(52) U.S. Cl. ......................................................... 47/72
(58) Field of Search ............................................. 47/72

(56) References Cited

U.S. PATENT DOCUMENTS

| | | |
|---|---|---|
| 524,219 A | 8/1894 | Schmidt |
| 732,889 A | 7/1903 | Paver |
| 950,785 A | 3/1910 | Pene |
| 1,044,260 A | 11/1912 | Schloss |
| 1,063,154 A | 5/1913 | Bergen |
| 1,446,563 A | 2/1923 | Hughes |
| 1,520,647 A | 12/1924 | Hennigan |
| 1,525,015 A | 2/1925 | Weeks |
| 1,610,652 A | 12/1926 | Bouchard |
| 1,697,751 A | 1/1929 | Blake .......................... 229/87 |
| 1,794,212 A | 2/1931 | Snyder |
| 1,811,574 A | 6/1931 | Barrett |
| 1,863,216 A | 6/1932 | Wordingham |
| 1,978,631 A | 10/1934 | Herrlinger ..................... 91/68 |

(List continued on next page.)

FOREIGN PATENT DOCUMENTS

| | | |
|---|---|---|
| AU | 4231978 | 6/1979 |
| BE | 654427 | 1/1965 |
| CH | 560532 | 4/1975 |
| DE | 15550 | 6/1900 |
| DE | 345464 | 12/1921 |

(List continued on next page.)

OTHER PUBLICATIONS

Speed Cover Brochure, "The Simple Solution For Those Peak Volume Periods", Highland Supply Corporation, ©1989.
"Speed Sheets and Speed Rolls" Brochure, Highland Supply Corporation, ©1990.
"Color Them Happy with Highlander Products" ©1992.
"Costa Keeps the Christmas Spirit", Supermarket Floral, Sep. 15, 1992.

(List continued on next page.)

Primary Examiner—Charles T. Jordan
Assistant Examiner—Francis T. Palo
(74) Attorney, Agent, or Firm—Dunlap, Codding & Rogers, P.C.

(57) ABSTRACT

A floral sleeve sized to fit about a flower pot or floral grouping. The sleeve has a base with side gussets and optionally bottom gussets for allowing expansion from a flattened position to an opened position. The sleeve may comprise a detachable upper portion, and a skirt portion. The sleeve is preferably secured about a pot or floral grouping via a banding element.

58 Claims, 5 Drawing Sheets

U.S. PATENT DOCUMENTS

| | | | |
|---|---|---|---|
| 2,048,123 A | 7/1936 | Howard | 229/87 |
| RE21,065 E | 5/1939 | Copeman | 93/2 |
| 2,170,147 A | 8/1939 | Lane | 206/56 |
| 2,200,111 A | 5/1940 | Bensel | 229/1.5 |
| 2,278,673 A | 4/1942 | Savada et al. | 154/43 |
| 2,302,259 A | 11/1942 | Rothfuss | 41/10 |
| 2,323,287 A | 7/1943 | Amberg | 229/53 |
| 2,355,559 A | 8/1944 | Renner | 229/8 |
| 2,371,985 A | 3/1945 | Freiberg | 206/46 |
| 2,411,328 A | 11/1946 | MacNabb | 33/12 |
| 2,510,120 A | 6/1950 | Leander | 117/122 |
| 2,529,060 A | 11/1950 | Trillich | 117/68.5 |
| 2,621,142 A | 12/1952 | Wetherell | 154/117 |
| 2,648,487 A | 8/1953 | Linda | 229/55 |
| 2,688,354 A | 9/1954 | Berger | 150/28 |
| 2,774,187 A | 12/1956 | Smithers | 47/41 |
| 2,822,287 A | 2/1958 | Avery | 117/14 |
| 2,846,060 A | 8/1958 | Yount | 206/58 |
| 2,850,842 A | 9/1958 | Eubank, Jr. | 47/58 |
| 2,883,262 A | 4/1959 | Borin | 21/56 |
| 2,989,828 A | 6/1961 | Warp | 53/390 |
| 3,022,605 A | 2/1962 | Reynolds | 47/58 |
| 3,080,680 A | 3/1963 | Reynolds | 47/37 |
| 3,094,810 A | 6/1963 | Kalpin | 47/37 |
| 3,121,647 A | 2/1964 | Harris et al. | 118/202 |
| 3,130,113 A | 4/1964 | Silman | 161/97 |
| 3,271,922 A | 9/1966 | Wallerstein et al. | 53/3 |
| 3,316,675 A | 5/1967 | Cartwright, Jr. | |
| 3,322,325 A | 5/1967 | Bush | 229/62 |
| 3,376,666 A | 4/1968 | Leonard | 47/41 |
| 3,380,646 A | 4/1968 | Doyen et al. | 229/57 |
| 3,431,706 A | 3/1969 | Stuck | 53/390 |
| 3,508,372 A | 4/1970 | Wallerstein et al. | 53/3 |
| 3,510,054 A | 5/1970 | Sanni et al. | 229/66 |
| 3,512,700 A | 5/1970 | Evans et al. | 229/53 |
| 3,550,318 A | 12/1970 | Remke et al. | 47/37 |
| 3,552,059 A | 1/1971 | Moore | 47/41.12 |
| 3,554,434 A | 1/1971 | Anderson | 229/55 |
| 3,556,389 A | 1/1971 | Gregoire | 229/53 |
| 3,557,516 A | 1/1971 | Brandt | 53/14 |
| 3,620,366 A | 11/1971 | Parkinson | 206/59 |
| 3,681,105 A | 8/1972 | Milutin | 117/15 |
| 3,767,104 A | 10/1973 | Bachman et al. | 229/7 |
| 3,793,799 A | 2/1974 | Howe | 53/32 |
| 3,869,828 A | 3/1975 | Matsumoto | 47/34.11 |
| 3,888,443 A | 6/1975 | Flanigen | 248/152 |
| 3,962,503 A | 6/1976 | Crawford | 428/40 |
| 4,043,077 A | 8/1977 | Stonehocker | 47/66 |
| 4,054,697 A | 10/1977 | Reed et al. | 428/40 |
| 4,091,925 A | 5/1978 | Griffo et al. | 206/423 |
| 4,113,100 A | 9/1978 | Soja et al. | 206/602 |
| 4,118,890 A | 10/1978 | Shore | 47/28 |
| 4,189,868 A | 2/1980 | Tymchuck et al. | 47/84 |
| 4,216,620 A | 8/1980 | Weder et al. | 47/72 |
| 4,248,347 A | 2/1981 | Trimbee | 206/423 |
| D259,333 S | 5/1981 | Charbonneau | D9/306 |
| 4,265,049 A | 5/1981 | Gorewitz | 47/26 |
| 4,280,314 A | 7/1981 | Stuck | 53/241 |
| 4,297,811 A | 11/1981 | Weder | 47/72 |
| 4,333,267 A | 6/1982 | Witte | 47/84 |
| 4,347,686 A | 9/1982 | Wood | 47/73 |
| 4,380,564 A | 4/1983 | Cancio et al. | 428/167 |
| 4,400,910 A | 8/1983 | Koudstaal et al. | 47/84 |
| 4,413,725 A | 11/1983 | Bruno et al. | 206/45.33 |
| D279,279 S | 6/1985 | Wagner | D11/143 |
| 4,546,875 A | 10/1985 | Zweber | 206/0.82 |
| 4,621,733 A | 11/1986 | Harris | 206/423 |
| 4,640,079 A | 2/1987 | Stuck | 53/390 |
| 4,717,262 A | 1/1988 | Roen et al. | 383/120 |
| 4,733,521 A | 3/1988 | Weder et al. | 53/580 |
| 4,765,464 A | 8/1988 | Ristvedt | 206/0.82 |
| 4,771,573 A | 9/1988 | Stengel | 47/67 |
| 4,773,182 A | 9/1988 | Weder et al. | 47/72 |
| 4,801,014 A | 1/1989 | Meadows | 206/423 |
| 4,810,109 A | 3/1989 | Castel | 383/105 |
| 4,835,834 A | 6/1989 | Weder | 29/525 |
| D301,991 S | 7/1989 | Van Sant | D11/149 |
| 4,941,572 A | 7/1990 | Harris | 206/423 |
| 4,946,290 A | 8/1990 | Matyja | 383/10 |
| 4,980,209 A | 12/1990 | Hill | 428/34.1 |
| 4,989,396 A | 2/1991 | Weder et al. | 53/397 |
| D315,700 S | 3/1991 | Stephens | D11/151 |
| 5,073,161 A | 12/1991 | Weder et al. | 493/154 |
| 5,074,675 A | 12/1991 | Osgood | 383/122 |
| 5,105,599 A | 4/1992 | Weder | 53/399 |
| 5,111,638 A | 5/1992 | Weder | 53/397 |
| 5,120,382 A | 6/1992 | Weder | 156/212 |
| 5,152,100 A | 10/1992 | Weder et al. | 47/72 |
| 5,181,364 A | 1/1993 | Weder | 53/397 |
| D335,105 S | 4/1993 | Ottenwalder et al. | D11/164 |
| 5,199,242 A | 4/1993 | Weder et al. | 53/397 |
| 5,205,108 A | 4/1993 | Weder et al. | 53/397 |
| 5,228,234 A | 7/1993 | de Klerk et al. | 47/41.01 |
| 5,235,782 A | 8/1993 | Landau | 47/72 |
| 5,239,775 A | 8/1993 | Landau | 47/72 |
| 5,249,407 A | 10/1993 | Stuck | 53/399 |
| 5,259,106 A | 11/1993 | Weder et al. | 29/469.5 |
| 5,307,606 A | 5/1994 | Weder | 53/410 |
| 5,315,785 A | 5/1994 | Avôt et al. | 47/72 |
| 5,350,240 A | 9/1994 | Billman et al. | 383/104 |
| 5,353,575 A | 10/1994 | Stepanek | 53/461 |
| 5,361,482 A | 11/1994 | Weder et al. | 29/469 |
| 5,388,695 A | 2/1995 | Gilbert | 206/423 |
| 5,428,939 A | 7/1995 | Weder et al. | 53/397 |
| 5,443,670 A | 8/1995 | Landau | 156/191 |
| 5,493,809 A | 2/1996 | Weder et al. | 47/72 |
| D368,025 S | 3/1996 | Sekerak et al. | D9/305 |
| 5,496,251 A | 3/1996 | Cheng | 493/224 |
| 5,496,252 A | 3/1996 | Gilbert | 493/224 |
| 5,526,932 A | 6/1996 | Weder | 206/423 |
| 5,551,570 A | 9/1996 | Shaffer et al. | 206/575 |
| 5,572,849 A | 11/1996 | Weder et al. | 53/399 |
| 5,572,851 A | 11/1996 | Weder | 53/399 |
| 5,617,703 A | 4/1997 | Weder | 53/413 |
| 5,624,320 A | 4/1997 | Martinez | 472/51 |
| 5,625,979 A | 5/1997 | Weder | |
| 5,647,168 A | 7/1997 | Gilbert | 47/72 |
| 5,647,193 A | 7/1997 | Weder et al. | 53/465 |
| 5,715,944 A | 2/1998 | Windisch | 206/423 |
| D404,684 S | 1/1999 | Shea | D11/164 |
| 5,974,730 A | 11/1999 | Chien | 47/41.01 |
| D419,436 S | 1/2000 | Celtorius et al. | D9/305 |
| 6,098,336 A | 8/2000 | Ferguson | 206/423 |
| 6,129,208 A | 10/2000 | Ferguson | 206/423 |
| 6,129,209 A | 10/2000 | Tchira | 206/423 |
| 6,401,388 B2 * | 6/2002 | Weder | 47/72 |
| 6,574,919 B2 * | 6/2003 | Weder | 47/72 |

FOREIGN PATENT DOCUMENTS

| | | |
|---|---|---|
| DE | 513971 | 11/1930 |
| DE | 1166692 | 3/1964 |
| DE | 1962947 | 6/1971 |
| DE | 2060812 | 11/1971 |
| DE | 2748626 | 5/1979 |
| DE | 3445799 | 6/1986 |
| DE | 3829281 | 5/1989 |
| DE | 3911847 | 10/1990 |
| EP | 0050990 | 5/1982 |
| EP | 0791543 | 8/1997 |
| FR | 1376047 | 9/1964 |
| FR | 2036163 | 12/1970 |

| | | |
|---|---|---|
| FR | 2137325 | 12/1972 |
| FR | 2272914 | 12/1975 |
| FR | 2489126 | 3/1982 |
| FR | 2610604 | 8/1988 |
| FR | 2603159 | 3/1989 |
| FR | 2619698 | 3/1989 |
| GB | 5605 | of 1885 |
| GB | 1204647 | 9/1970 |
| GB | 2056410 | 3/1981 |
| GB | 2074542 | 11/1981 |
| GB | 2128083 | 4/1984 |
| GB | 2203127 | 10/1988 |
| GB | 2212136 | 7/1989 |
| GB | 2252708 | 8/1992 |
| IT | 224507 | 4/1996 |
| JP | 542958 | 2/1993 |
| JP | 0612755 | 5/1994 |
| JP | 8-19334 | 1/1996 |
| NL | 8301709 | 12/1984 |
| NL | 1000658 | 1/1996 |
| WO | 9315979 | 8/1993 |
| WO | 9712819 | 4/1997 |

OTHER PUBLICATIONS

"Super Seller", Supermarket Floral, Sep. 15, 1992.
"Halloween", Link Magazine, Sep. 1992.
"Now More Than Ever", Supermarket Floral, Sep. 15, 1992.
Le Plant Sac Advertisement, published prior to Sep. 26, 1987.
"A World of Cut Flower and Pot Plant Packaging" Brochure, Klerk's Plastic Products Manufacturing, Inc., published prior to Mar. 31, 1994, 6 pages.
Chantler & Chantler brochure showing Zipper Sleeve™ and Florasheet®, published prior to Mar. 31, 1994, 2 pages.
"Stand Alone Plastic Bagmaking" brochure, AMI, Atlanta, GA, Feb. 15, 1996, 2 pages.
"Foil Jackets" brochure, Custom Medallion, Inc., Dec. 1996, 2 pages.
"Derwent Abstract" of FR 2610604A. It is noted that the abstract is an incorrect English translation of the contents of the French patent. The French patent does not enable or disclose adhesively attaching the covering to the container. 1988.
"Silver Linings" Brochure, Affinity Diversified Industries, Inc., 1986. The Silver Linings brochure shows a floral sleeve with a closed bottom. The brochure shows, in one embodiment, a vase with flowers inside a cut "cut flower" sleeve with the sleeve tied with a ribbon about the neck of the vase.
"Special Occasion Printed Highlophane Bags" Brochure, Highland Supply Corporation, 1990, 2 pages.
"Creative Packaging" Brochure, John Henry Company, Sep. 1992.
"Make Highlander Your Headquarters" Brochure, Highland Supply Corporation, 1991.

* cited by examiner

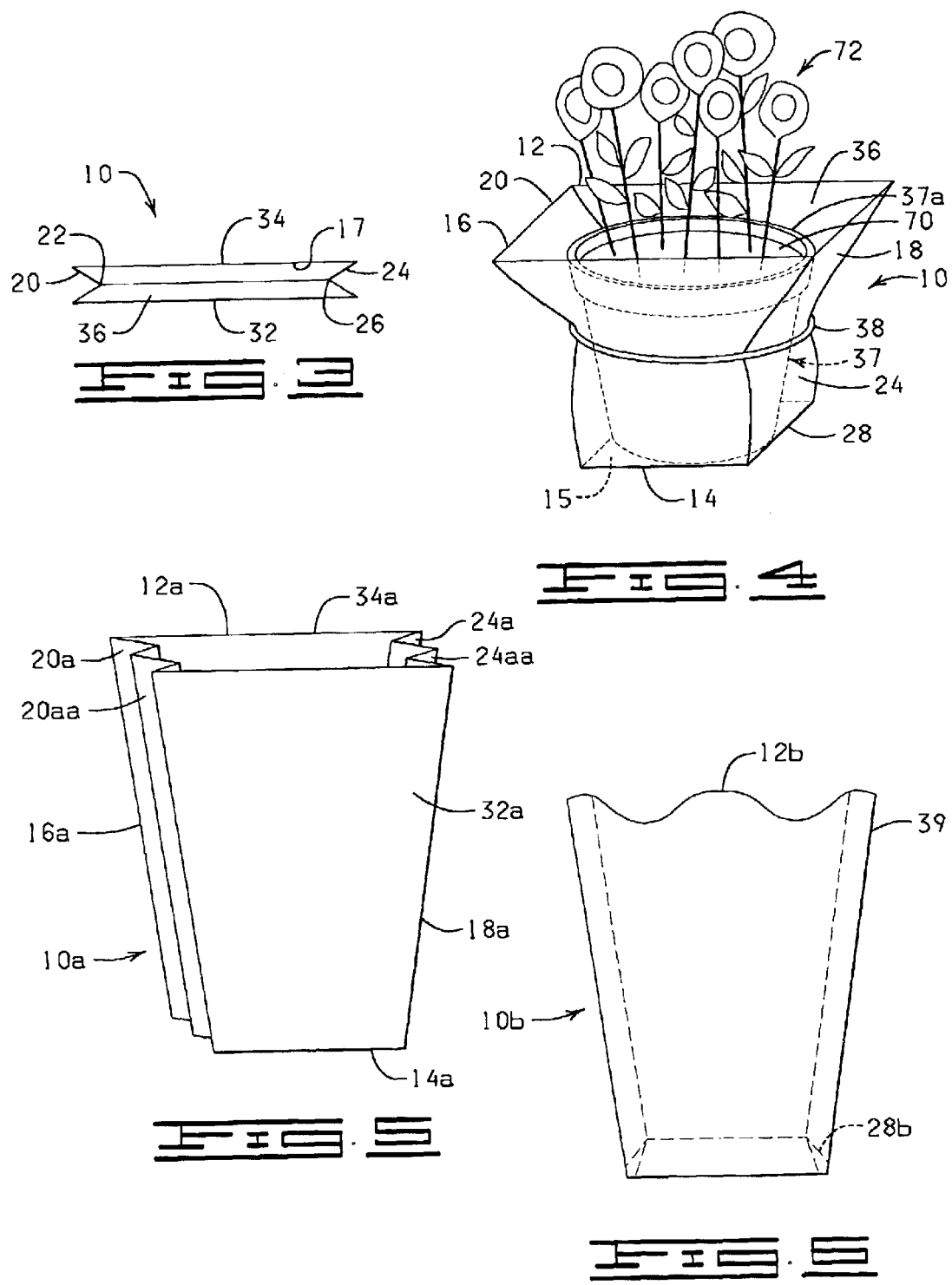

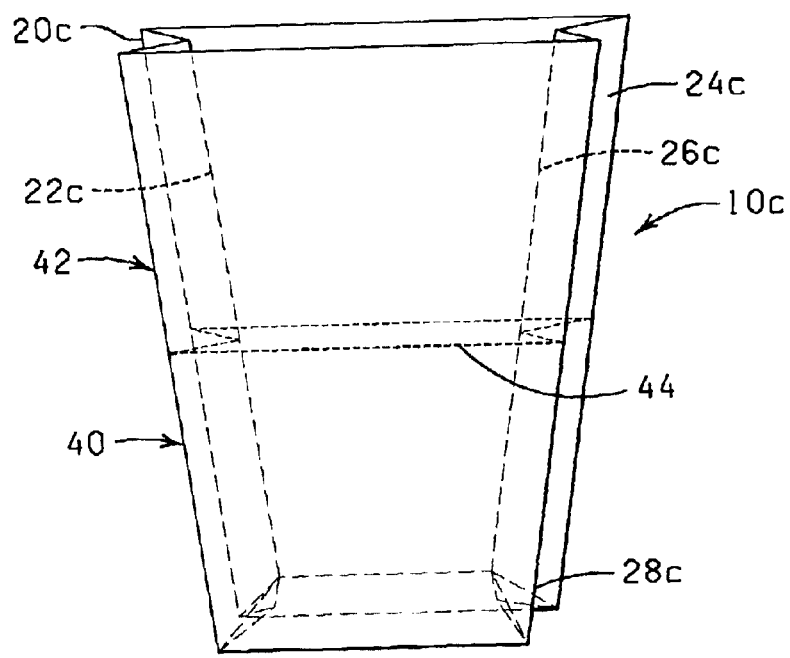
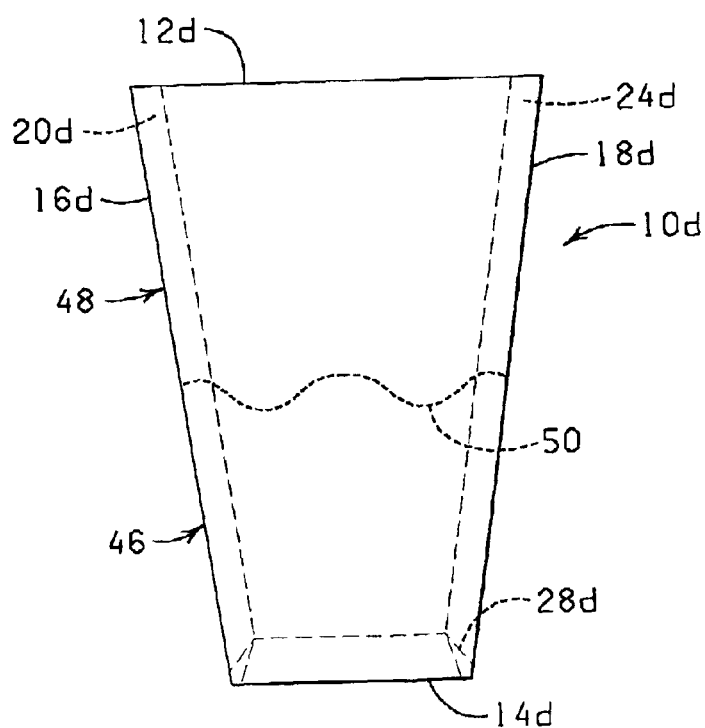
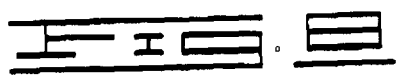

US 6,779,301 B2

METHOD OF CONTAINING A POT OR FLORAL GROUPING IN A SLEEVE HAVING EXPANDABLE SIDEWALLS

CROSS REFERENCE TO RELATED APPLICATIONS

The present application is a continuation of U.S. Ser. No. 10/090,009, filed Feb. 27, 2002 now U.S. Pat. No. 6,574,919, which is a continuation-in-part of U.S. Ser. No. 09/899,416, filed Jul. 5, 2001, now U.S. Pat. No. 6,401,388, which is a continuation of U.S. Ser. No. 09/360,865, filed Jul. 23, 1999, now U.S. Pat. No. 6,125,578, which is a continuation-in-part of U.S. Ser. No. 09/146,162, filed Sep. 2, 1998, now U.S. Pat. No. 6,105,310, issued Aug. 22, 2000, which is a continuation in part of Ser. No. 09/064,460, filed Apr. 22, 1998, now U.S. Pat. No. 6,151,830, issued on Nov. 28, 2000, which is a continuation-in-part of U.S. Ser. No. 08/788,616 filed Jan. 27, 1997, now U.S. Pat. No. 5,749,171, issued on May 12, 1998, which is a continuation-in-part of U.S. Ser. No. 08/237,078, filed May 3, 1994, now U.S. Pat. No. 5,625,979, issued on May 6, 1997. Each of these applications is hereby expressly incorporated by reference herein in its entirety.

FIELD OF THE INVENTION

This invention generally relates to sleeves, and, more particularly, to sleeves used to contain floral groupings and media, or used to wrap flower pots containing floral groupings and/or media containing floral groupings, and methods of using same.

BRIEF DESCRIPTION OF THE DRAWINGS

FIG. 3 is a cross-sectional view of the sleeve of FIG. 2, taken along line 3—3 thereof.

FIG. 4 is a perspective view of the sleeve of FIG. 2 fully expanded and having a pot disposed therein, with the sleeve banded about the pot.

FIG. 5 is a perspective view of a sleeve similar to the sleeve of FIG. 1, the sleeve being partially expanded and having two gussets in each side of the sleeve.

FIG. 6 is an elevational view of another sleeve constructed in accordance with the present invention and having a non-linear upper end.

FIG. 7 is a perspective view of a partially expanded sleeve having an upper portion detachable via a line of perforations.

FIG. 8 is an elevational view of a sleeve similar to the sleeve of FIG. 7 but having a non-linear line of perforations.

DESCRIPTION OF THE PREFERRED EMBODIMENTS

Figure 1:
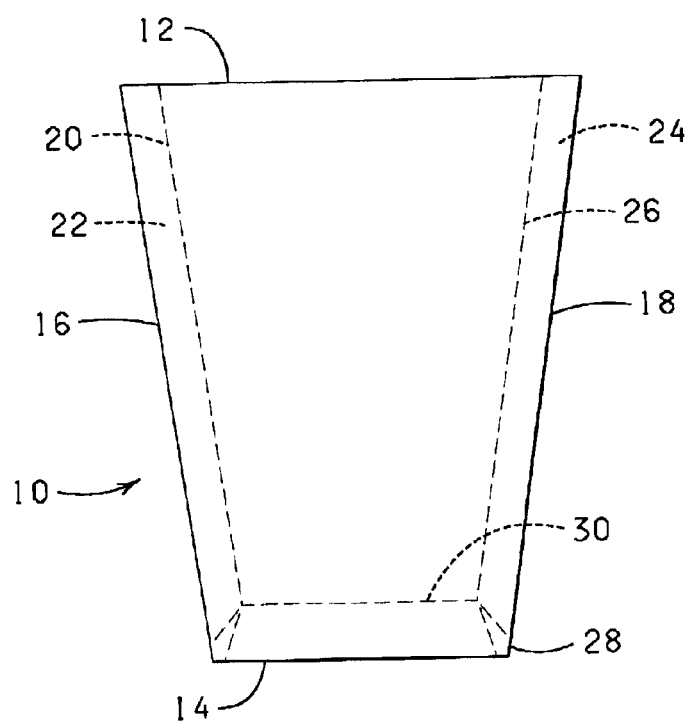
FIG. 1 is an elevational view of a sleeve having a gusset in each side thereof.

The present invention is a preformed sleeve for covering a flower pot (also referred to herein as pot). The preformed sleeve has an upper end, a lower end and an outer peripheral surface. The preformed sleeve may also be used as a container for a plant. The preformed sleeve comprises a base portion having an upper end, a lower end, and an interior space sized to contain the flower pot or medium for containing a plant. A skirt portion may optionally extend from the upper end of the base portion. The preformed sleeve includes one or more expansion elements which are one or more gussets in each side of the base portion and, optionally, in the skirt portion, when present, and optionally, in an upper detachable portion when present. The preformed sleeve is initially formed in a flattened condition and may be shipped in a flattened condition or may be expanded to an open condition prior to shipment. The base portion of the sleeve optionally further includes a gusset in the bottom thereof. Each side and the bottom of the preformed sleeve may include more than one gusset therein. A bonding material may be disposed on an inner surface of the base portion for connecting the preformed sleeve to the flower pot. Alternatively, the sleeve may be secured to the pot via a banding element. The gusset functions to allow the base portion to expand to contain the flower pot and to conform to the shape of an outer peripheral surface of the flower pot when the flower pot is disposed within the preformed sleeve. The preformed sleeve may further include a detachable upper sleeve portion generally sized to enclose a floral grouping, and which when detached, may allow the skirt portion, if present, to extend away from the base portion when the flower pot is disposed within the base portion of the preformed sleeve. The upper portion, when present, may be detachable via perforations, tear strips, weakened areas, or zippers. The upper sleeve portion may have an area which serves as a handle or support device. The gussets may extend the entire length from the lower end of the base portion to the upper end of the preformed sleeve or may extend only an intermediate distance therebetween.

The expansion elements are not intended to be limited only to the gussets shown herein, in view of the fact that gussets and their manufacture are well known to those of ordinary skill in the art of manufacturing bags.

The preformed sleeve may form part of a plant package when used in conjunction with the flower pot which is disposed within the retaining space of the base portion of the preformed sleeve, the flower pot having a floral grouping disposed therein, and wherein the flower pot is substantially surrounded and encompassed by the base portion of the preformed sleeve and the floral grouping is substantially surrounded and enclosed by the upper sleeve portion of the preformed sleeve in those embodiments wherein the upper sleeve portion forms a part of the preformed sleeve.

Further, the detachable upper sleeve portion, when present, may extend from the upper end of the skirt, when present, or it may be connected to the base portion. When the upper sleeve portion is connected to the base portion, it may be connected to an inner portion of the base portion, leaving the skirt portion exposed, or it may be attached to an outer portion of the base portion, thereby enclosing the skirt portion until the upper sleeve portion is detached from the base portion thereby exposing the skirt portion.

The preformed sleeve may be constructed from one or more types of material. The preformed sleeve may comprise a portion of a plant package which additionally includes the flower pot disposed within the preformed sleeve, the flower pot having a floral grouping disposed therein, and wherein the flower pot is substantially surrounded and encompassed by the base portion of the preformed sleeve. Alternatively, the plant package may comprise only the preformed sleeve, a plant, and a medium for containing the plant.

These embodiments and others of the present invention are now described in more detail below. It will be appreciated that the examples provided herein are not intended to limit the scope and extent of the claimed invention but are only intended to exemplify various embodiments of the invention contemplated herein.

The Embodiments and Methods of Use of FIGS. 1–12

Shown in FIGS. 1–4, and designated therein by the general reference numeral 10, is a flexible preformed tubular sleeve (also referred to herein as sleeve 10). The sleeve 10 is initially formed in a flexible flat collapsed state which is openable in the form of a tube or sleeve having a closed bottom, or a closed bottom having drainage holes or a partially open bottom. Prior to shipment to a user, or prior to use by the user, the sleeve 10 may be expanded into an opened configuration. The sleeve 10 is preferably tapered outwardly from a lower end 14 toward a larger diameter at an upper end 12. In the flattened state, the sleeve 10 preferably has an overall trapezoidal or modified trapezoidal shape, and when opened is substantially frusto-conical. It will be appreciated, however, that the sleeve 10 may be variations on the aforementioned shapes or may be significantly altered shapes, such as square or rectangular, as long as the sleeve 10 functions in accordance with the present invention in the manner described herein.

Figure 2:
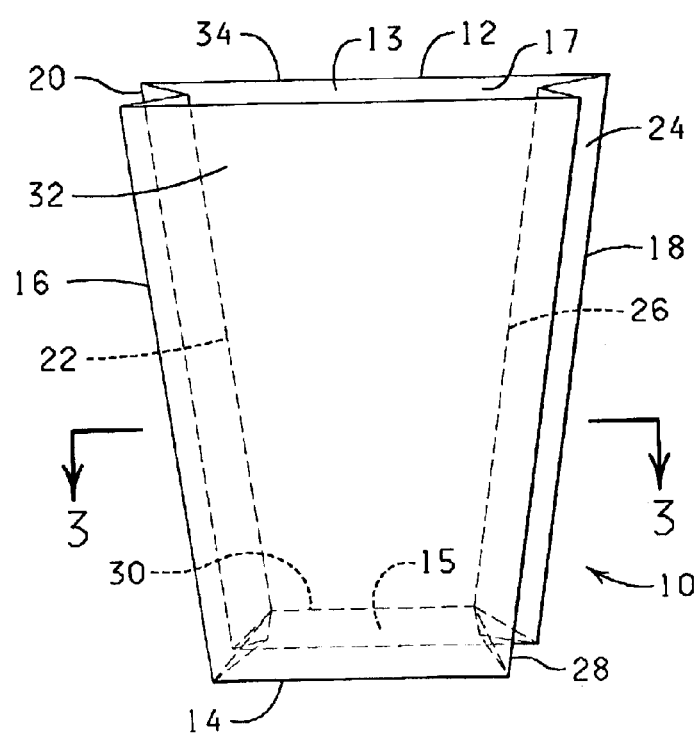
FIG. 2 is a perspective view of the sleeve of FIG. 1 partially expanded.

The sleeve 10, in addition to the upper end 12 and the lower end 14, has a first side 16 and a second side 18 when the sleeve 10 is in the flattened state, as shown in FIG. 1. The sleeve 10 has an opening 13 (FIG. 2) at the upper end 12 and is closed with a bottom 15 at the lower end 14. The sleeve 10 also has an inner peripheral surface 17 which, when the sleeve 10 is opened, defines and encompasses an inner retaining space 36, as indicated in FIGS. 3 and 4. The first side 16 includes a first side gusset 20 having an inner fold 22. The second side 18 includes a second side gusset 24 having an inner fold 26. A portion of the lower end 14 of the sleeve 10 is preferably folded to form one or more bottom gussets 28 constructed in a manner well known to one of ordinary skill in the art as shown in FIG. 1, for permitting a bottom of an object such as a potted plant to be disposed into the inner retaining space 36 of the sleeve 10. Each bottom gusset 28 of the sleeve 10 has an inner fold 30, as shown in FIGS. 1 and 2. The lower end 14 of the sleeve 10, and particularly the bottom gusset 28 therein, may be constructed to form a round bottom sleeve in the manner shown in U.S. Pat. No. 6,182,395, the specification of which is hereby expressly incorporated herein in its entirety. A sleeve in an alternate embodiment may be constructed without a gusset in its lower end. In another embodiment, the bottom gusset 28 may be constructed in a different configuration from that shown herein. The sleeve 10 further comprises a first panel 32 disposed between sides 16 and 18, and a second panel 34 disposed between sides 16 and 18, opposite panel 32, substantially as shown in FIG. 2.

Further, the sleeve 10 may have any shape, whether geometric, non-geometric, asymmetrical and/or fanciful as long as it functions in accordance with the present invention. The sleeve 10 may also be equipped with a drainage element (e.g., one or more holes) in the lower end 14 thereof or ventilation holes (not shown), or the sleeve 10 can be made from permeable or impermeable materials.

FIG. 3 is a cross-sectional view of the sleeve 10 taken along line 3–3 of FIG. 2. The sleeve 10 is partially expanded, showing the first side gusset 20 with inner fold 22, the second side gusset 24 with inner fold 26, the first panel 32 and the second panel 34 and the inner peripheral surface 18 which, when the sleeve 10 is opened, defines the inner retaining space 36. When the sleeve 10 is in the fully open configuration, as shown in FIG. 4, the first and second side gussets 20 and 24 are expanded to form sides 16 and 18 of the sleeve 10, respectively. Similarly, bottom gusset 28 is opened to form the bottom 15 of the sleeve 10 when the bottom gusset 28 is present. Preferably, the sleeve 10 is sized to contain and conform to one of a variety of standard sizes of flower pots known to those of ordinary skill in the art, such as 4-inch, 5-inch, 6-inch, 7-inch and 8-inch flower pots. As noted above, the sleeve 10 may be used to contain a plant and a growing medium without the use of a flower pot.

As shown in FIG. 4, the sleeve 10 in the opened condition contains a pot 37. Preferably the sleeve 10 is secured about the pot 37 via a banding element 38 which is automatically or manually placed thereabout. The banding element 38 may be disposed below an upper rim 37a of the pot 37 as shown in FIG. 4, or above the upper rim 37a. The pot 37 may have a floral grouping (also referred to herein as a plant) 72, and a growing medium 70 disposed therein. Any of the other sleeves described herein may be secured about the pot 37 in a similar manner by the banding element 38. The banding element 38 may be a string, a tie, a wire, a ribbon, an elastic band, a rigid collar, a heat shrink material, or any other type of banding device known to those of ordinary skill in the art.

A sleeve 10a contemplated herein may have more than one side and/or bottom gusset, for example as shown in FIG. 5. Sleeve 10a is provided with an upper end 12a, a lower end 14a, a first side 16a and a second side 18a. The sleeve 10a has two gussets 20a and 20aa in the first side 16a, and two gussets 24a and 24aa in the second side 18a. The sleeve 10a further has a first panel 32a and a second panel 34a.

FIG. 6 shows a sleeve 10b having a curved, or non-linear, upper end 12b and a bottom gusset 28b. The non-linear upper end 12b, which constitutes a skirt portion 39, may be wavy, sinusoidal, scalloped, crenulate, crenelate, zig-zagged, or toothed, in any regular or irregular pattern.

The invention further contemplates a sleeve 10c shown in FIG. 7. Sleeve 10c is constructed in a manner similar to any of sleeves 10–10b, except sleeve 10c includes a lower portion 40 and an upper portion 42. The upper portion 42 is detachable from the lower portion 40 via a detaching element, such as perforations 44. The sleeve 10c has a first side gusset 20c having inner fold 22c, a second side gusset 24c having inner fold 26c, and a bottom gusset 28c, similar to the previously-described sleeves. The term "detaching element," as used generally herein, means any element, or combination of elements, or features, such as, but not by way of limitation, perforations, tear strips, weakened areas, zippers, and any other devices or elements of this nature known in the art, or any combination thereof, which enable the tearing away or detachment of one object from another. Therefore, while perforations 44 are shown and described in detail herein, it will be understood that tear strips, zippers, or any other "detaching elements" known in the art, or any combination thereof, could be substituted therefore and/or used therewith. Preferably, the upper portion 42 is sized to substantially enclose a floral grouping, and lower portion 40 is sized to contain and enclose a flower pot.

FIG. 8 shows a sleeve 10d similar to sleeve 10c except sleeve 10d includes a lower portion 46 and an upper portion 48 which is detachable from the lower portion 46 via a detaching element, such as perforations 50 having a non-linear pattern. The perforations 50 may have one of the same patterns as described above for the upper end 12b of sleeve 10b. Sleeve 10d further includes an upper end 12d, a first side 16d and a second side 18d, each side with a gusset 20d and 24d, respectively, and a lower end 14d with a gusset 28d.

Figure 9:
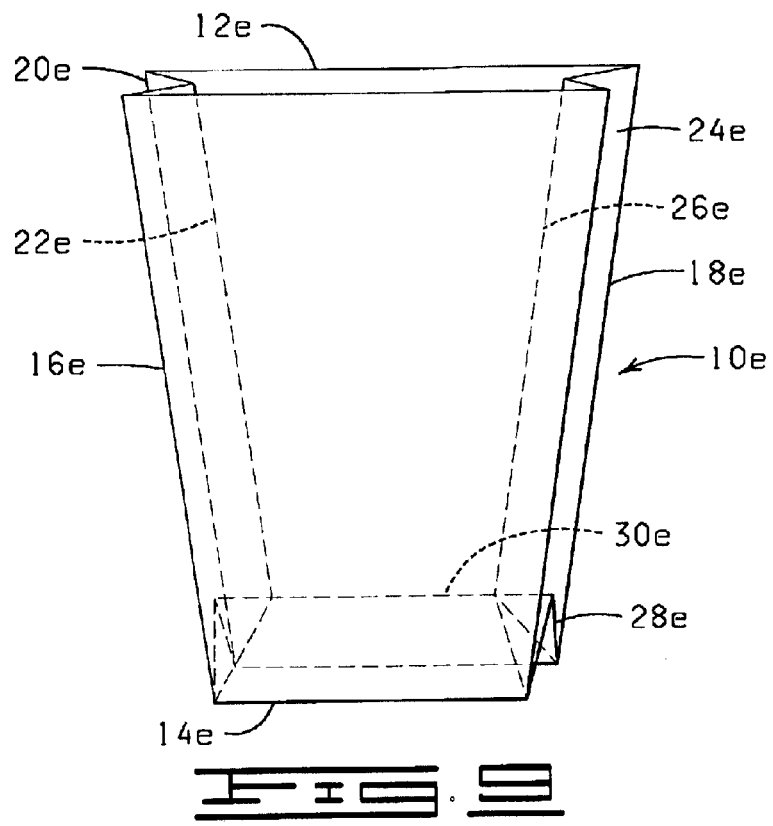
FIG. 9 is a perspective view of a partially expanded sleeve having a gusset in each side and having a bottom gusset, the bottom gusset being of a different configuration than the bottom gusset of the sleeves in FIGS. 1–8.

As noted elsewhere herein, the configurations of the gussets shown in the sleeves 10–10d of FIGS. 1–8 are not the only configurations contemplated for the present invention. Any gusset which functions in accordance with the present invention may be used. For example, FIG. 9 shows a sleeve 10e having an upper end 12e, a first side 16e having a first side gusset 20e with an inner fold 22e, and a second side 18e having a second side gusset 24e with an inner fold 26e and a lower end 14e having a bottom gusset 28e with an inner fold 30e, which comprise configurations different from corresponding features of the sleeves of FIGS. 1–8. Sleeve 10e, however, functions in essentially the same manner, and is otherwise constructed in the same manner, as the sleeves of FIGS. 1–8.

Figure 10:
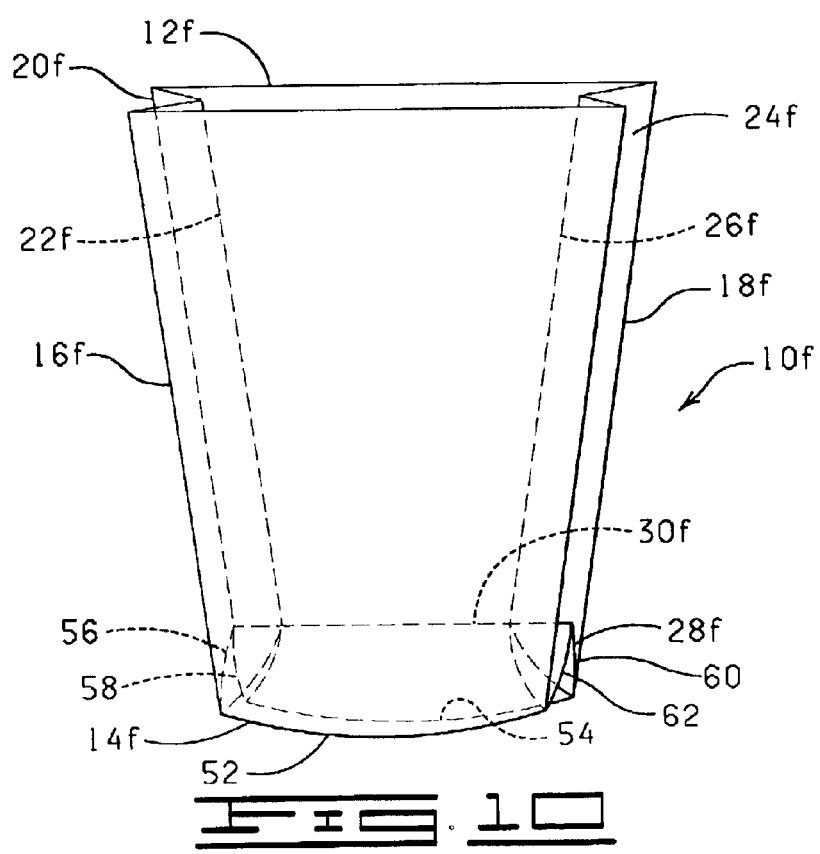
FIG. 10 is a perspective view of a partially expanded sleeve similar to the sleeve of FIG. 9 but having a concave lower end.

FIG. 10 shows a sleeve 10f which is constructed in a manner similar to that of sleeve 10e in FIG. 9, except for the configuration of a lower end 14f of the sleeve 10f. Sleeve 10f has an upper end 12f, the lower end 14f, a first side 16f with a first side gusset 20f having an inner fold 22f, and a second side 18f with a second side gusset 24f having an inner fold 26f. The lower end 14f has a bottom gusset 28f having an inner fold 30f. The bottom gusset 28f has curved portions 52 and 54 which provide the lower end 14f of the sleeve 10f with the appearance of being curved when in the flattened condition. The gusset 28f also has curved portions 56 and 58 in the first side 16f and curved portions 60 and 62 in the second side 18f. The curved portions 52–62 of the bottom gusset 28f provide the sleeve 10f with a rounded bottom in the open condition for more closely conforming to the rounded configuration of a round-bottom flower pot.

Figure 11:
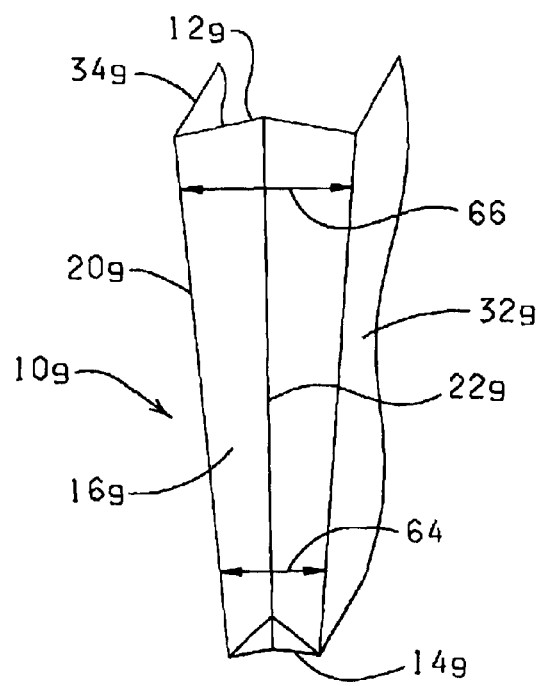
FIG. 11 is a side view of a portion of a sleeve having a tapered side gusset.

Any sleeve described herein may be constructed in a manner similar to a sleeve 10g shown in FIG. 11, wherein a side gusset 20g having an inner fold 22g in a first side 16g is tapered to have a lesser width 64 at a lower end 14g and a greater width 66 at an upper end 12g. Such a configuration enables the sleeve 10g to have a tapered shape not only in the dimension spanning the first and second panels 32g and 34g, respectively, but also in the dimension spanning sides (not shown) of the sleeve 10g.

Figure 12:
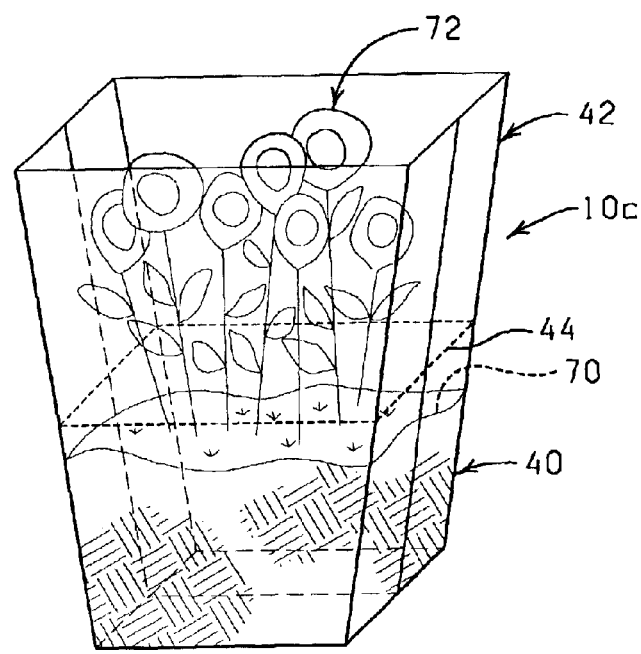
FIG. 12 is a perspective view of the sleeve of FIG. 7 fully expanded and containing a plant and growing medium.

FIG. 12 shows the sleeve 10c of FIG. 7, having the lower portion 40 and upper portion 42 which are separable via perforations 44, the sleeve 10c being used as a container for a plant medium 70 and a plant 72, disposed within the medium 70 without using a flower pot. In a preferred version, the lower portion 40 is constructed of a material resistant or impermeable to leakage, while the upper portion 42 is primarily constructed of a thinner transparent or translucent material.

The material from which the sleeves 10–10g are constructed preferably has a thickness in a range from about 0.1 mil to about 30 mils. Often, the thicknesses of the sleeves 10–10g are in a range from about 0.5 mil to about 10 mils. Preferably, each of the sleeves 10–10g has a thickness in a range from about 1.0 mil to about 5 mils. More preferably, the sleeves 10–10g are constructed from a material which is flexible, semi-rigid, rigid, or any combination thereof. The sleeves 10–10g may be constructed of a single layer of material or a plurality of layers of the same or different types of materials. Any thickness of the material may be utilized as long as the material functions in accordance with the present invention and is expandable to an open position as described herein. The layers of material comprising the sleeves 10–10g may be connected together or laminated or may be separate layers. Such materials used to construct the sleeves 10–10g are described in U.S. Pat. No. 5,111,637 entitled "Method For Wrapping A Floral Grouping" issued to Weder et al., on May 12, 1992, which is hereby expressly incorporated herein by reference. Any thickness of material may be utilized in accordance with the present invention as long as the sleeves 10–10g may be formed as described herein, and as long as the formed sleeves 10–10g may contain at least a portion of a flower pot or potted plant or a floral grouping, as described herein. Additionally, an insulating material such as bubble film, preferably one of two or more layers, can be utilized in order to provide additional protection for the item, such as the floral grouping, contained therein.

In one embodiment, the sleeves 10–10g may be constructed from a sheet comprising two polypropylene films. The polypropylene films comprising the sleeves 10–10g may be connected together or laminated or may be separate layers. In an alternative embodiment, the sleeves 10–10g may be constructed from only one of the polypropylene films.

The sleeves 10–10g are constructed from any suitable material that is capable of being formed into a sleeve and wrapped about a flower pot and a floral grouping disposed therein. Preferably, the material comprises paper (untreated or treated in any manner), metal foil, polymeric film, non-polymeric film, fabric (woven or nonwoven or synthetic or natural), cardboard, fiber, cloth, burlap, or laminations or combinations thereof.

The term "polymeric film" means a man-made polymer such as a polypropylene or a naturally occurring polymer such as cellophane. A polymeric film is relatively strong and not as subject to tearing (substantially non-tearable), as might be the case with paper or foil.

The material comprising the sleeves 10–10g may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992 and which is hereby expressly incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. The material may further comprise, or have applied thereto, one or more scents. Each of the above-named characteristics may occur alone or in combination and may be applied to an upper and/or lower surface of the material comprising the sleeves 10–10g. Moreover, portions of the material used in constructing the sleeves 10–10g may vary in the combination of such characteristics. The material utilized for the sleeves 10–10g may be opaque, translucent, transparent, or partially clear or tinted transparent.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping comprises a bloom or foliage portion and a stem portion. Further, the floral grouping may comprise a growing potted plant having a root portion (not shown) as well. However, it will be appreciated that the floral grouping may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

In accordance with the present invention, a bonding material may be disposed on a portion of the sleeves 10–10g to assist in holding the sleeves 10–10g to the flower pot with or without the bonding element 38 when such a flower pot is disposed within the sleeves 10–10g or to assist in closing or sealing the upper portion of the sleeves 10–10g or in adhering the sleeves 10–10g to the flower pot after the flower pot has been disposed therein; for example, in the manner shown in U.S. Pat. No. 5,493,809, which is hereby expressly incorporated by reference herein in its entirety.

It will be understood that the bonding material may be disposed as a strip or block on a surface of the sleeves 10–10g. The bonding material may also be disposed upon either an outer peripheral surface or an inner peripheral surface of any of the sleeves 10–10g, as well as upon the flower pot. Further, the bonding material may be disposed as spots of bonding material, or in any other geometric, non-geometric, asymmetric, or fanciful form, and in any pattern including covering either the entire inner peripheral surface and/or outer peripheral surface of any of the sleeves 10–10g and/or the flower pot. The bonding material may be covered by a cover or release strip which can be removed prior to the use of the sleeve and/or flower pot. The bonding material can be applied by means known to those of ordinary skill in their art. One method for disposing a bonding material, in this case an adhesive, is described in U.S. Pat. No. 5,111,637 entitled "Method For Wrapping A Floral Grouping" issued to Weder et al., on May 12, 1992, which has been expressly incorporated by reference above.

The term "bonding material," when used herein means an adhesive, frequently a pressure sensitive adhesive, or a cohesive. When the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material," when used herein also means a heat sealing lacquer or hot melt material which may be applied to the material and, in this instance, heat, sound waves, or vibrations, also must be applied to effect the sealing.

In one version of the present invention a strip of bonding material (not shown) may be disposed adjacent the upper end of the sleeve for allowing the upper end to be sealed for enclosing the upper portion of the sleeve about a floral grouping disposed therein. In another version of the present invention, a sleeve may comprise a flap positioned at the upper end which can be folded over and sealed with a flap bonding strip to an adjacent portion of the outer peripheral surface of the sleeve near the upper end thereof. Other versions of the sleeve (not shown) may include ventilation holes or drainage means (e.g., holes in the lower end 14) for allowing movement of gases or moisture to and away from the inner space of the sleeve.

In another embodiment, the sleeve, may further comprise an extended portion having apertures therein, which portion extends away from a portion of the upper end of the sleeve for allowing the sleeve to be supported on a support assembly commercially available and known by one of ordinary skill in the art such as a pair of wickets for shipment, storage, assembly of the sleeve, placement of the flower pot within the sleeve, or other functions known in the art. The extension may have a plurality of perforations or other detaching means for allowing the extension to be removed from the upper end sleeve after the sleeve has been provided for use as described elsewhere herein. In another version of the invention a sleeve has an extended portion comprising a handle for carrying the potted plant package by the sleeve. The sleeve may further comprise a detaching element comprising perforations for removing the handle at a later time.

Other versions of the present invention may comprise additional perforated areas for enhancing angularity of the extension of a skirt portion away from a base portion after an upper portion of the sleeve has been detached. Examples of such sleeves described above herein comprising these additional features are shown in FIGS. 6–8 and 14–20 of U.S. Pat. No. 5,625,979 and the corresponding descriptions therein, which are specifically hereby incorporated herein by reference.

Each side gusset of the sleeve comprises one or more areas of excess material which may have the form of a pleat which extends from the lower end to the upper end of the sleeve. Preferably the surfaces of the facing surfaces of the gussets are substantially unconnected to each other along their lengths.

The side gussets in the sleeve contemplated herein may be constructed in such a way that each side gusset extends completely from the lower end of the sleeve to the upper end of the sleeve, for example as shown in FIG. 1. Alternatively, a sleeve may comprise gussets which extend from the upper end only part of the distance toward the lower end or from the lower end to only the part of the distance toward the upper end.

It will generally be desired to use the sleeve 10 as a covering for a potted plant.

The term "flower pot" as used herein refers to any type of container used for holding a floral grouping or plant. Examples of flower pots, used in accordance with the present invention include, but not by way of limitation, clay pots, foam pots, wooden pots, plastic pots, pots made from natural and/or synthetic fibers, or any combination thereof.

The flower pot is adapted to receive a floral grouping in the retaining space. The floral grouping may be disposed within the flower pot along with a suitable growing medium described in further detail below, or other retaining medium, such as a floral foam. It will also be understood that the floral grouping, and any appropriate growing medium or other retaining medium, may be disposed in the sleeve without a flower pot (see FIG. 12).

It will be understood by a person of ordinary skill in the art that equipment and devices for forming floral sleeves are commercially available, and are well known to a person of ordinary skill in the art. For example, the sleeves described herein may be formed by advancing two separate webs, one or two webs preformed in the form of a tube, or a single web folded double and sealing the longitudinal sides and bottom of the two facing panels then cutting the sleeve thus formed from the webs or web. Machines which can form sleeves from such single webs or pairs of webs are well within the knowledge of one of ordinary skill in the art.

It should also be noted that for all versions of sleeves described, it may be desirable to have a release material or cover strip covering the adhesive or cohesive bonding material when such a bonding material is disposed on any portion of the sleeve for preventing the bonding material from bonding to another surface until the desired time. Further, in each of the cases described herein wherein a sleeve is applied to a flower pot or a covered pot, the sleeve may be applied thereto either by depositing the flower pot or covered pot downwardly into the open retaining space of the sleeve, or the sleeve may be brought upwardly about the flower pot or covered pot from below the flower pot or a covered pot.

It should be further noted that various features of the versions of the present invention such as closure bonding areas, support extensions, handles, additional perforations, drainage means, ventilation holes, combinations of material may be used alone or in combination as elements of any of the embodiments described above herein.

Changes may be made in the construction and the operation of the various components, elements and assemblies described herein or in the steps or the sequence of steps of the methods described herein without departing from the spirit and scope of the invention as defined in the following claims.

What is claimed is:

1. A method of containing a pot or a floral grouping, comprising:
   providing a preformed sleeve initially having a flattened condition prior to being opened for use, and having an upper end, a lower end, a first side, a second side, a first panel and a second panel, the preformed sleeve having a tapered shape, and having an expansion element in each of the first side and the second side;
   opening the preformed sleeve from the flattened condition by expanding the expansion elements in the preformed sleeve forming an opened sleeve;
   disposing a pot or a floral grouping within the opened sleeve; and
   securing the opened sleeve about the pot or floral grouping with a banding element.

2. The method of claim 1 wherein in the step of providing a preformed sleeve each expansion element has an inner fold.

3. The method of claim 1 wherein in the step of providing a preformed sleeve, the preformed sleeve further comprises a skirt portion which extends above the upper end of the pot when the pot is disposed within the opened sleeve.

4. The method of claim 3 wherein in the step of providing a preformed sleeve the skirt portion has an upper end having a non-linear pattern.

5. The method of claim 1 wherein in the step of providing a preformed sleeve, the preformed sleeve further comprises a detachable upper portion.

6. The method of claim 5 wherein the detachable upper portion of the preformed sleeve has a first expansion element in a first side thereof and a second expansion element in a second side thereof.

7. The method of claim 5 wherein the detachable upper portion of the preformed sleeve is detachable via a detaching element selected from the group consisting of perforations, tear strips and zippers.

8. The method of claim 5 wherein the detachable upper portion of the preformed sleeve is detachable via perforations having a non-linear pattern.

9. The method of claim 1 wherein in the step of providing a preformed sleeve the lower end of the preformed sleeve is curved.

10. The method of claim 1 wherein in the step of providing a preformed sleeve the preformed sleeve comprises an adhesive or cohesive bonding material disposed upon a portion thereof.

11. The method of claim 1 wherein in the step of opening the preformed sleeve the opened sleeve substantially conforms to an overall shape of the pot when said pot is disposed within the opened sleeve.

12. The method of claim 5 wherein the detachable upper portion of the preformed sleeve has an upper end which has an adhesive or cohesive bonding material thereon for sealing the upper end of the upper portion.

13. The method of claim 1 wherein in the step of securing the opened sleeve with a banding element, the banding element is further defined as a string, a tie, a wire, a ribbon, an elastic band, a plastic strip or tube, a heat shrink material, or a rigid collar.

14. The method of claim 5 wherein in the step of providing the preformed sleeve, the detachable upper portion of the preformed sleeve is adapted to enable the preformed sleeve to be supported on a support assembly.

15. The method of claim 5 wherein in the step of providing the preformed sleeve, the detachable upper portion of the preformed sleeve is sized to substantially enclose a floral grouping or plant disposed within the pot.

16. A method of containing a pot or floral grouping, comprising:
   providing a preformed sleeve initially having a flattened condition prior to being opened for use, and having an upper end, a lower end, a first side, a second side, a first panel and a second panel, the preformed sleeve having an expansion element in each of the first side, and the second side, and the preformed sleeve further comprising a detachable upper portion;
   opening the sleeve from the flattened condition by expanding the expansion elements in the preformed sleeve forming an opened sleeve;
   disposing a pot or floral grouping within the opened sleeve; and
   securing the opened sleeve about the pot or floral grouping with a banding element.

17. The method of claim 16 wherein in the step of providing a preformed sleeve at least a portion of the preformed sleeve is tapered.

18. The method of claim 16 wherein in the step of providing a preformed sleeve the detachable upper portion of the preformed sleeve is detachable via perforations.

19. The method of claim 16 wherein in the step of providing a preformed sleeve, the preformed sleeve further comprises a skirt portion and wherein the detachable upper portion of the preformed sleeve is detachable from the skirt portion.

20. The method of claim 19 wherein in the step of providing a preformed sleeve the skirt portion has an upper end having a non-linear pattern.

21. The method of claim 16 wherein in the step of providing a preformed sleeve each expansion element has an inner fold.

22. The method of claim 16 wherein in the step of providing a preformed sleeve the lower end of the preformed sleeve is curved.

23. The method of claim 16 wherein in the step of providing a preformed sleeve the detachable upper portion of the preformed sleeve has a first expansion element in a first side thereof and a second expansion element in a second side thereof.

24. The method of claim 16 wherein in the step of opening a preformed sleeve the opened sleeve substantially conforms to an overall shape of the pot when said pot is disposed within the opened sleeve.

25. The method of claim 18 wherein in the step of providing a preformed sleeve the detachable upper portion of the preformed sleeve is detachable via perforations having a non-linear pattern.

26. The method of claim 16 wherein in the step of providing a preformed sleeve the detachable upper portion of the preformed sleeve has an upper end which has an adhesive or cohesive bonding material thereon for sealing the upper end of the detachable upper portion.

27. The method of claim 16 wherein in the step of securing the opened sleeve with a banding element, the banding element is further defined as a string, a tie, a wire, a ribbon, an elastic band, a plastic strip or tube, a heat shrink material, or a rigid collar.

28. The method of claim 16 of the preformed sleeve wherein in the step of providing the preformed sleeve, the detachable upper portion of the preformed sleeve is adapted to enable the preformed sleeve to be supported on a support assembly.

29. The method of claim 16 wherein in the step of providing the preformed sleeve, the detachable upper portion of the preformed sleeve is sized to substantially enclose a floral grouping or plant disposed within the pot.

30. A plant package comprising a preformed sleeve and a pot or a floral grouping, the plant package produced by the method comprising:

providing a preformed sleeve initially having a flattened condition prior to being opened for use, and having an upper end, a lower end, a first side, a second side, a first panel and a second panel, the preformed sleeve having a tapered shape, and having an expansion element in each of the first side and the second side;

opening the preformed sleeve from the flattened condition by expanding the expansion elements in the preformed sleeve forming an opened sleeve;

disposing a pot or a floral grouping within the opened sleeve; and securing the opened sleeve about the pot or floral grouping with a banding element.

31. The plant package of claim 30 wherein each expansion element of the preformed sleeve has an inner fold.

32. The plant package of claim 30 wherein the preformed sleeve further comprises a skirt portion which extends above the upper end of the pot when the pot is disposed within the opened sleeve.

33. The plant package of claim 32 wherein the skirt portion has an upper end having a non-linear pattern.

34. The plant package of claim 30 wherein the preformed sleeve further comprises a detachable upper portion.

35. The plant package of claim 34 wherein the detachable upper portion of the preformed sleeve has a first expansion element in a first side thereof and a second expansion element in a second side thereof.

36. The plant package of claim 34 wherein the detachable upper portion of the preformed sleeve is detachable via a detaching element selected from the group consisting of perforations, tear strips and zippers.

37. The plant package of claim 34 wherein the detachable upper portion of the preformed sleeve is detachable via perforations having a non-linear pattern.

38. The plant package of claim 30 wherein the lower end of the preformed sleeve is curved.

39. The method of claim 30 wherein the preformed sleeve comprises an adhesive or cohesive bonding material disposed upon a portion thereof.

40. The plant package of claim 30 wherein the opened sleeve substantially conforms to an overall shape of the pot when said pot is disposed within the opened sleeve.

41. The plant package of claim 34 wherein the detachable upper portion of the preformed sleeve has an upper end which has an adhesive or cohesive bonding material thereon for sealing the upper end of the upper portion.

42. The plant package of claim 30 wherein the banding element is further defined as a string, a tie, a wire, a ribbon, an elastic band, a plastic strip or tube, a heat shrink material, or a rigid collar.

43. The plant package of claim 34 wherein the detachable upper portion of the preformed sleeve is adapted to enable the preformed sleeve to be supported on a support assembly.

44. The plant package of claim 34 wherein the detachable upper portion of the preformed sleeve is sized to substantially enclose a floral grouping or plant disposed within the pot.

45. A plant package comprising a preformed sleeve and a pot or floral grouping, the plant package produced by the method comprising:

providing a preformed sleeve initially having a flattened condition prior to being opened for use, and having an upper end, a lower end, a first side, a second side, a first panel and a second panel, the preformed sleeve having an expansion element in each of the first side, and the second side, and the preformed sleeve further comprising a detachable upper portion;

opening the sleeve from the flattened condition by expanding the expansion elements in the preformed sleeve forming an opened sleeve;

disposing a pot or floral grouping within the opened sleeve; and securing the opened sleeve about the pot or floral grouping with a banding element.

46. The plant package of claim 45 wherein at least a portion of the preformed sleeve is tapered.

47. The plant package of claim 45 wherein the detachable upper portion of the preformed sleeve is detachable via perforations.

48. The plant package of claim 45 wherein the preformed sleeve further comprises a skirt portion and wherein the detachable upper portion of the preformed sleeve is detachable from the skirt portion.

49. The plant package of claim 48 wherein the skirt portion of the preformed sleeve has an upper end having a non-linear pattern.

50. The plant package of claim 45 wherein a preformed sleeve each expansion element has an inner fold.

51. The plant package of claim 45 wherein the lower end of the preformed sleeve is curved.

52. The plant package of claim 45 wherein the detachable upper portion of the preformed sleeve has a first expansion element in a first side thereof and a second expansion element in a second side thereof.

53. The plant package of claim 45 wherein the opened sleeve substantially conforms to an overall shape of the pot when said pot is disposed within the opened sleeve.

54. The plant package of claim 45 wherein the detachable upper portion of the preformed sleeve is detachable via perforations having a non-linear pattern.

55. The plant package of claim 45 wherein the detachable upper portion of the preformed sleeve has an upper end which has an adhesive or cohesive bonding material thereon for sealing the upper end of the detachable upper portion.

56. The plant package of claim 45 wherein the banding element is further defined as a string, a tie, a wire, a ribbon, an elastic band, a plastic strip or tube, a heat shrink material, or a rigid collar.

57. The plant package of claim 45 wherein the detachable upper portion of the preformed sleeve is adapted to enable the preformed sleeve to be supported on a support assembly.

58. The plant package of claim 45 wherein the detachable upper portion of the preformed sleeve is sized to substantially enclose a floral grouping or plant disposed within the pot.

* * * * *